UNITED STATES PATENT OFFICE.

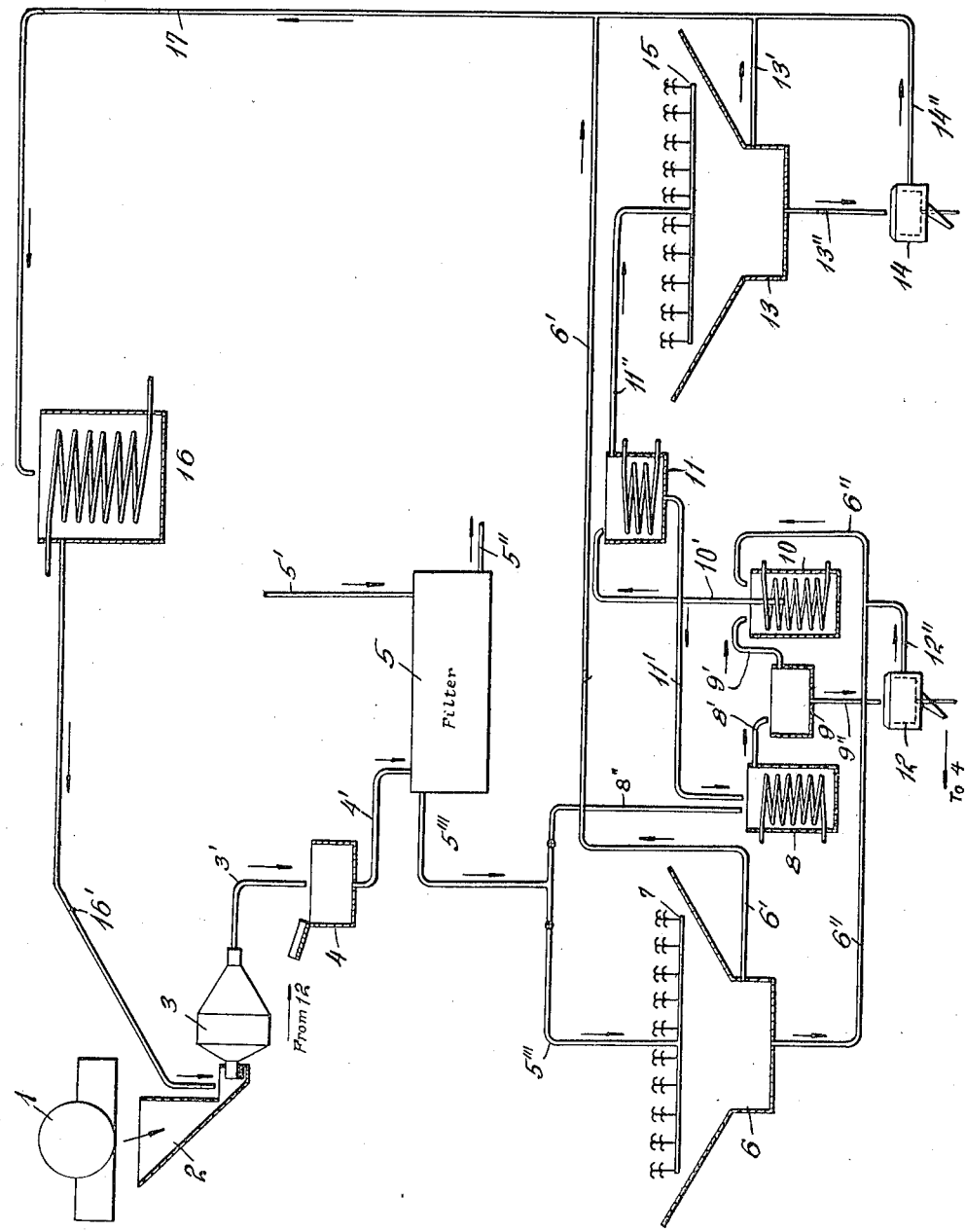

HARRISON STREETER COE, OF MOUND CITY, KANSAS, ASSIGNOR TO THE DORR COMPANY, A CORPORATION OF DELAWARE.

CONCENTRATION OF SODIUM NITRATE OR POTASSIUM NITRATE.

1,292,580.  Specification of Letters Patent.  Patented Jan. 28, 1919.

Application filed September 29, 1917. Serial No. 193,903.

*To all whom it may concern:*

Be it known that I, HARRISON STREETER COE, residing at Mound City, in the county of Linn, State of Kansas, have invented certain new and useful Improvements in Concentration of Sodium Nitrate or Potassium Nitrate; and I do hereby declare the following to be a full, clear, and exact description of the invention, such as will enable others skilled in the art to which it appertains to make and use the same.

This invention relates to the production of niter, either sodium nitrate or potassium nitrate, from niter-bearing earthy and crystalline material or from niter-bearing residues or by-products of industrial plants.

It has for an object the securing of a more complete recovery of niter from the raw material and to do this at low expense by avoiding troublesome heating or extensive evaporation.

Two methods are in use for obtaining niter of commercial purity from natural niter-bearing material or from niter-bearing residues from industrial plants. The ordinary method consists in treating the niter-bearing material in counter current with niter solutions of progressively decreasing strengths under progressively decreasing temperatures so that the solution yielded by the first treatment is saturated with niter at a temperature of from 100 to 110 degrees C. This solution is drained from the undissolved residue of the material and cooled, thus crystallizing out niter of a commercial grade. The evaporation incident to the heating aids materially in strengthening the solution and in disposing of the water used in finally washing the residues.

The solid materials remaining behind when the concentrated niter liquor is drained off are still wet with the rich liquor and so hold a considerable quantity of the original niter content. Washing in leaching vats may be resorted to, but on washing with water the previously precipitated sodium chlorid and the like go into solution and troublesome and expensive evaporation of the solution must be resorted to, and besides, the solution obtained by washing is so lean in niter and so rich in sodium chlorid and similar materials that the operation is not economical. Perfect washing is not practical and under any circumstances much niter-bearing solution is lost in the residue.

The second method consists in leaching the ore or other niter-bearing material with a more dilute niter solution than the hot solution above described and later concentrating by evaporation until by increase in temperature and in niter content the sodium chlorid and like impurities are crystallized out and precipitated. Thereupon the rich niter liquor is drawn off and cooled and by crystallization there is obtained niter of commercial purity. So extensive a system of evaporation is unavoidably quite expensive and if the evaporation is not carried far enough the impurities such as sodium chlorid and the like will remain in solution and will crystallize out along with the niter when the liquor is cooled, thereby rendering the crystallized product of a grade undesirable for commercial purposes.

By the use of the present invention I am able to avoid the troublesome high heating of the first process above outlined and the extensive and expensive evaporation incident to the second method above referred to.

I have found that the niter-bearing material such as niter ore or niter-bearing industrial residues may be treated with an aqueous solution of niter and caused to give up substantially its full niter content and I am able to do this in such a way that evaporation of relatively large volumes of water is avoided. In fact by judicious handling of the process the amount of water constantly being added to the system need not appreciably exceed that discharged with the wet ore residues plus the amount naturally evaporated during the treatment for solution of niter. The temperature at which the niter-bearing material is treated is considerably below the temperature at which most of the sodium chlorid is thrown out of solution and consequently on completion of the treatment of the ore with the aqueous solution of sodium nitrate the resulting liquor will, on chilling or cooling, yield by crystallization, an impure nitrate. In this crystallized product I have substantially all of the niter content of the original material under treatment, but I have with it so much sodium chlorid and other like impurities that the product is not marketable as commercial nitrate. However, by subsequent steps in the process I eliminate to a great extent the impurities and obtain a high grade nitrate.

Briefly stated the subsequent treatment of this impure crystallized nitrate consists in mixing it with a proper proportion of solution which is saturated with niter and impurities either when cool or when moderately hot and then digesting the mixture at a high temperature, whereupon the niter present will dissolve and the sodium chlorid and some other impurities will remain undissolved and part of the sodium chlorid and certain other impurities initially present in the solution will be deposited from the solution as the niter is dissolved. The substances which have failed to go into solution or which have been precipitated out may be allowed to settle out and subsequently freed from niter solution by a centrifugal drying or by filtration and later can be re-treated together with fresh niter-bearing material to remove the last of the niter content.

The solution thus produced by digesting the impure crystallized nitrate with the rich solution of impure nitrate may be made to contain such a niter content that upon chilling or slow cooling there will crystallize out a commercially pure nitrate. Such a solution will be similar in every way to the solutions of full crystallizing strength sought by the two processes now in use, as above outlined, and yet will have been obtained without the loss of nitrate in the residue now incident to the hot digesting method and without the expensive step of concentration by evaporation which is inherent in the second method. Further, looking at the process from a different angle it will be seen that the invention contemplates the digestion of an impure niter with an impure solution of niter, with the production of two important results, viz., the addition of niter to the solution and the precipitation of impurities therefrom.

The details of the operation by which substantially the entire niter content of the original material is caused to go into solution and the subsequent steps whereby that impure solution is freed from much of its sodium chlorid and other impurities to yield a solution from which commercial niter can be crystallized are set forth hereinafter more in detail in connection with an apparatus indicated by the accompanying drawing.

In the drawing the figure illustrates diagrammatically and with parts in section a system whereby the proposed process can be carried out.

The process claimed may be carried out with apparatus varying radically from that indicated in the drawing, but the drawing shows one satisfactory arrangement of elements. The details of these elements and their relation to one another are set forth, so far as they are relevant, in the following description of the process as a whole.

In the process the niter-bearing material is first crushed in a crushing machine of any particular type illustrated conventionally on the drawing, and designated by the numeral 1. From the crusher the material falls into a storage bin 2 and from the storage bin the material is drawn and mixed with hot niter solution from the tank 16, and the mixture is charged into a ball mill 3. This solution is obtained in the process and is, when cold, saturated with niter and with sodium chlorid. In the ball mill 3 the material and solution become thoroughly ground to form a slime or slurry which is led off by pipe 3' into tank 4 where it becomes mixed with further solid material from the centrifugal machine 12, as more fully described hereinafter. The mixed solid and niter solution is drawn off from the tank 4 into a conventionally shown filter 5 where the solids are separated from the slime, and, after having been washed with a small amount of fresh water supplied through pipe 5', are discharged at 5''. The clear solution from the filter 5 is drawn off through pipe 5''' and a portion of it is conducted to the cooling spray 7. The liquid falling from the spray 7 through the atmosphere becomes materially cooled and somewhat more concentrated by evaporation, and on being collected in crystallizer 6, crystallizes out a considerable proportion of the dissolved solids, which solids are the impure nitrate hereafter referred to. The solution from crystallizer 6 is drawn off through pipe 6' to the main 17 and returned to tank 16. The solids from crystallizer 6, which solids are impure nitrate crystals, are conveyed to digester 10 for further treatment.

The portion of the solution from the filter 5 not conveyed to spray 7 is led into digester 8 where it is mixed with solids from heated settler 11. These solids are composed of the impure nitrate from crystallizer 6 which have been digested with a very strong nitrate solution and contain some nitrate and most of the impurities from the final solution of nitrate. Digester 8 is heated by means of a steam coil and the solution produced by the digestion is a moderately strong solution of nitrate containing some sodium chlorid. The mixture of solids and liquid is transferred to settler 9, and sodium chlorid and other impurities separated out and are drawn off into centrifugal machine 12. The solution from the settler 9 is conveyed to digester 10 where it is mixed with impure nitrate from crystallizer 6 and partly digested under heat from the steam coil therein. The mixture of solids and liquids from digester 10 having a temperature of from 100 to 120° C. is conveyed without cooling to settler 11, where the partly digested impure nitrate from digester 10 is settled out and sent to digester 8. The digestion in 10 completes the saturation with nitrate and substantially completes the elimination of the sodium chlorid from solution. The solution from 11 is conveyed to the cooling spray 15 which causes the solution to be cooled and concentrated by evaporation. Crystals of commercially pure nitrate are deposited in crystallizer 13, which crystals are drawn off, centrifuged and packed as a final product, and from crystallizer 13 and centrifugal machine 14 is conveyed the mother liquor to main 17 and thence to tank 16. The solution in tank 16 is thus seen to be a nitrate solution which is saturated at ordinary temperatures with both niter and sodium chlorid, and which, when heated, is capable of taking up more nitrate. This solution is heated to from 50° to 70° C. by means of the steam coil in tank 16 and returned to the process through the ball mill 3, as shown. The solid material conveyed from the settler 9 into centrifugal machine 12 is composed largely of sodium chlorid, but may contain some nitrate both undissolved and in the solution remaining therein. The liquid separated by the machine is drawn off through pipe 12'' into pipe 6'' and thence to digester 10. The solids after having been treated in the machine are returned to tank 4, where they are mixed with the fresh, raw material and the solution coming from ball mill 3.

It is to be understood that the installation of apparatus includes the supply of any valves, pumps and conveyers necessary to control or cause the transfer of liquids or solids or mixtures thereof to and through and out of the system. It is also to be understood that by properly regulating the supply of material the process may be made continuous, or substantially so.

In explanation of the process the following points are stated.

The solution in tank 16 is, when cold, a saturated solution of nitrate and it also contains some sodium chlorid. This solution when heated to from 50 to 70° C. becomes capable of dissolving considerable nitrate, but very little more sodium chlorid. The quantity of sodium chlorid in solution will be the same each time the solution goes to spray 7 and is determined by the temperature and the percentage of nitrate contained, as these conditions limit the power of the solution to dissolve sodium chlorid. Any excess of sodium chlorid is accordingly discharged from the system along with the insoluble portion of the ore.

It will be seen therefore that I am operating with a solution that is at all times substantially or completely saturated with common salt, but capable of taking up and depositing nitrate with the corresponding changes in temperature.

What I claim is:

1. The process of recovering niter from niter-bearing material, which comprises dissolving the niter from the said material by treatment at a temperature from about 50° C. to about 70° C. with a solution which is saturated when cold or moderately warm with niter and also with soluble impurities of the niter-bearing material, and cooling the solution so produced to obtain an impure nitrate; substantially as described.

2. The process of recovering niter from niter-bearing material, which comprises dissolving the niter from the said material by treatment with a heated solution which is saturated when cold or moderately warm with niter and also with soluble impurities of the niter-bearing material, and digesting at a higher temperature the solution so produced with impure nitrate so as to add to the solution a further proportion of nitrate; substantially as described.

3. The process of recovering niter from niter-bearing material, which comprises dissolving the niter from the said material by treatment with a heated solution which is saturated when cold or moderately warm with niter and also with soluble impurities of the niter-bearing material, digesting at a higher temperature the solution so produced with impure nitrate so as to add to the solution a further proportion of nitrate, cooling the latter solution with the solids therein suspended to deposit the solid material containing most of the impurities and returning the latter to the first stage of the process; substantially as described.

4. The process of recovering niter from niter-bearing material, which comprises dissolving the niter from the said material by treatment with a heated solution which is saturated when cold or moderately warm with niter and also with soluble impurities of the niter-bearing material, digesting at a higher temperature the solution so produced with impure nitrate so as to add to the solution a further proportion of nitrate, causing the latter solution with the solids therein suspended to deposit the solid material containing most of the impurities and returning the latter to the first stage of the process, and digesting with the mother liquor from the last step and at a temperature of 100 to 120° C. impure nitrate so as to form a saturated solution of nitrate, then separating and cooling this solution to crystallize out commercially pure nitrate; substantially as described.

5. The process of recovering niter from niter-bearing material, which comprises the steps of crushing the ore, grinding the crushed ore in the presence of a heated solution of niter, separating the liquids and solids while warm, crystallizing impure niter from a portion of said solution, digesting with the remaining portion of the solution impure niter containing solids from a subsequent step, cooling the mixture to cause crystallization of the dissolved salts, separating the solution therefrom, digesting with this solution at a higher temperature the impure niter crystals first obtained, separating the solids, cooling the solution to crystallize out commercially pure nitrate and returning the mother liquor to the first stage of the process; substantially as described.

6. The process, which comprises chilling a warm nearly saturated solution containing nitrate and impurities to produce impure crystals of niter and digesting these with an under-saturated solution of niter at a higher temperature, settling out the undissolved material and crystallizing niter from the solution; substantially as described.

7. The process, which comprises passing a body of liquid which is cold saturated with sodium nitrate and sodium chlorid through a niter-bearing material while maintaining a temperature of 50 to 70° C., dividing the resultant solution, cooling one part thereof to crystallize impure niter, digesting this impure niter in a plurality of steps with the other part of the said solution on the counter-current principle and at successively higher temperatures, crystallizing the niter from the so-produced solution and returning the mother liquid to the first step for the treatment of further raw material; substantially as described.

8. The process, which comprises passing a body of liquid which is saturated when cold with sodium nitrate and sodium chlorid through a niter-bearing material while maintaining a temperature of 50 to 70° C., washing the undissolved material with an amount of water substantially equal to that lost in the process and adding the washings to the solution, dividing the resultant solution, cooling one part thereof to crystallize impure niter, digesting this impure niter in a plurality of steps with the other part of the said solution on the counter-current principle and at successively higher temperatures, crystallizing the niter from the so-produced solution and returning the mother liquor to the first step for the treatment of further raw material; substantially as described.

9. The process of recovering niter from niter-bearing materials which comprises treating said materials to obtain the niter thereof in solution, and purifying the resulting niter solution by digestion thereof at a high temperature with impure niter crystals whereby further niter is added to and impurities are precipitated from the solution; substantially as described.

10. The process of recovering niter from niter-bearing material, which comprises dissolving the niter from said material under such conditions that the resulting solution contains in addition to the niter a relatively large amount of impurities, cooling said resulting solution to obtain impure crystals of niter, and digesting at a high temperature said impure crystals of niter with a solution which is saturated with niter and impurities when cool or moderately warm, whereby the niter content of said impure crystals is dissolved without dissolving the impurities thereof and impurities in said solution are deposited therefrom, and crystallizing niter from the solution produced by the digesting operation; substantially as described.

11. The process of recovering niter from niter-bearing material, which comprises dissolving the niter from said material by treatment at a temperature from about 50° C. to about 70° C. with a solution which is saturated when cold or moderately warm with niter and with soluble impurities of the niter-bearing material, cooling the solution so produced to obtain impure niter crystals, digesting said impure niter crystals at a temperature from about 100° C. to about 120° C. with a solution which, when cool or moderately warm, is saturated with niter and impurities, and crystallizing niter from the solution produced by the digesting operation; substantially as described.

12. The process of recovering niter from niter-bearing material, which comprises dissolving the niter from said material by treatment with a solution which is saturated when cold or moderately warm with niter and with soluble impurities of the niter-bearing material, the temperature of said solution during the treatment of said niter-bearing material therewith being considerably below the temperature at which the greater portion of said impurities is deposited out, whereby the resulting solution produced by said treatment contains, in addition to the niter content of said material, a relatively large amount of impurities, and cooling the solution so produced to obtain impure niter crystals; substantially as described.

In testimony whereof I affix my signature.

HARRISON STREETER COE.